United States Patent [19]

Porcaro et al.

[11] Patent Number: 5,699,511

[45] Date of Patent: Dec. 16, 1997

[54] SYSTEM AND METHOD FOR DYNAMICALLY VARYING LOW LEVEL FILE SYSTEM OPERATION TIMEOUT PARAMETERS IN NETWORK SYSTEMS OF VARIABLE BANDWIDTH

[75] Inventors: Thomas Joseph Porcaro; Theodore Clayton Waldron, III; Richard Byron Ward; Krishna Kishore Yellepeddy, all of Austin, Tex.

[73] Assignee: International Business Machines Corporation, Armonk, N.Y.

[21] Appl. No.: 540,431

[22] Filed: Oct. 10, 1995

[51] Int. Cl.$^6$ ................................................ G06F 11/00
[52] U.S. Cl. ................ 395/185.08; 395/182.22; 395/200.12
[58] Field of Search .................. 395/185.08, 182.02, 395/184.01, 200.13, 200.19, 200.11, 200.12, 550, 186, 187.01, 559, 182.22; 371/33, 32, 62, 61

[56] References Cited

U.S. PATENT DOCUMENTS

| | | | |
|---|---|---|---|
| 4,117,459 | 9/1978 | Douglas et al. | 395/185.08 |
| 4,549,297 | 10/1985 | Nishimoto | 371/33 |
| 4,616,359 | 10/1986 | Fontenot | 370/60 |
| 5,041,966 | 8/1991 | Nakai et al. | 395/550 |
| 5,058,056 | 10/1991 | Hammer et al. | 395/182.02 |
| 5,167,035 | 11/1992 | Mann et al. | 395/182.02 |
| 5,287,362 | 2/1994 | Liencres | 395/185.08 |
| 5,333,265 | 7/1994 | Orimo et al. | 395/200 |
| 5,375,068 | 12/1994 | Palmer et al. | 364/514 |
| 5,459,837 | 10/1995 | Caccavale | 395/184.01 |
| 5,475,813 | 12/1995 | Cieslak et al. | 395/182.02 |

FOREIGN PATENT DOCUMENTS 8-8995   1/1996   Japan ................... H04L 29/08

OTHER PUBLICATIONS

Markoulidakis et al., "Periodic Attachment in Future Mobile Telecommunications", IEEE Trans. on Vehicular Techonology, pp. 555–564, Sep. 1995.

"Tingle A Suite for Monitoring Networks", *IEEE*, Apr. 18–19, 1991, J. Brock, pp. 235–242.

*Primary Examiner*—Robert W. Beausoliel, Jr.
*Assistant Examiner*—Joseph E. Palys
*Attorney, Agent, or Firm*—Mark S. Walker

[57] ABSTRACT

An improved file system apparatus and method for minimizing the length of time a client system waits before declaring a data communication link disconnected. The apparatus and method dynamically modify a file system request time-out value based on the actual length of time required to service each file system request. In one embodiment, a time-out value is determined for each request type based on the actual response time and a buffer time for each request type. The response timer is based on readings from a system clock therefore operating as a low overhead process. A monitoring system periodically tests the server to ensure that a physical connection still exists.

18 Claims, 5 Drawing Sheets

SYSTEM AND METHOD FOR DYNAMICALLY VARYING LOW LEVEL FILE SYSTEM OPERATION TIMEOUT PARAMETERS IN NETWORK SYSTEMS OF VARIABLE BANDWIDTH

BACKGROUND OF THE INVENTION

1. Field of the Invention

The present invention relates to electronic data processing systems and more particularly to distributed data processing systems for accessing data from a remote server. Still more particularly, the present invention relates to apparatus and processes for monitoring low level file system requests over networks of varying bandwidth.

2. Background and Related Art

Individual computer systems are often connected to other computer systems using local area network (LAN) or wide area network (WAN) technology. Interconnected systems can share system resources such as disk storage and printers. Client/Server systems are implemented in this environment by distributing the processing, storage or function between a client and a server workstation. The client workstation makes a request that is satisfied by a server workstation.

LAN/WAN networks have typically been implemented so that each workstation has a solid connection of defined bandwidth with the server. The solid connection and defined bandwidth provide relatively uniform access times between the client and server systems.

Distributed terminal systems are implemented using asynchronous connections between a terminal and a computer system. The asynchronous connections can be over dedicated wires or through dial-up telephone lines. Asynchronous processing allows for great variation in communications speed. Each request over the system is acknowledged so that any disconnection or delay in transmission can be noted and handled by the system. Lost transmissions may be resent until the entire message is received. Asynchronous processing allows greater variety of connection media, but typically is slower with greater overhead than directly connected LAN workstations.

The evolving network market has led to an increased number of methods for interconnecting workstations. One approach allows asynchronous connection into a LAN through telephone lines. This approach is found in the IBM LAN Distance Program Product. This product allows a client workstation to dial into a LAN from a remote location. Implementation requires specific LAN Distance software at both the client and server workstations.

Another interconnection technology is infrared (IR) connection. Infrared Direct Access connection (IRDA) replaces traditional wiring with a wireless system which uses infrared signals to transmit data. One disadvantage of IRDA systems is that physical obstruction of the line of sight path causes intermittent disconnection of the infrared device. Software operating over IRDA links must be able to continue processing through intermittent disconnections.

Radio Frequency (RF) links are another wireless alternative to connect to a LAN. RF signals are also subject to intermittent interruption.

Cellular telephone technology provides yet another wireless alternative for LAN connection. Cellular signals are subject to interruption due to switching or interruption by a physical obstruction such a tunnel or structure.

These technologies provide mechanisms for establishing data communication links to remote clients. These mechanisms are incorporated into a number mobile products used by an increasing number of people. Mobile products such as laptop or palmtop computer systems, and personal digital assistants (PDA) often use wireless communications data links to connect directly from the remote device to a server.

The computer acting as the server to the mobile clients typically includes a server file management system that enables client systems to store and access files on the server. The file management system is part of the server network operating system (NOS). Such systems include the IBM LAN Server Program Product and the Novell Netware Program Product. In addition, server file systems such as the Network File System (NFS) and Andrew File System(AFS) are provided on servers based on the UNIX* Operating System. (UNIX is a registered trademark in the United States and other countries licensed exclusively through X/Open Company Ltd.)

Existing server file systems compensate for temporary disconnections by assigning a time-out period for each low level file system access request. If the request has not been satisfied within the time-out period, the system signals that the data communications link has become disconnected and further processing ceases.

Determining the appropriate time-out value for low level file system requests can be difficult. If the time-out period is set too short, the system will signal disconnection when the signal has had only an intermittent interruption. Selection of a longer time-out period, however, may cause the system to wait for a potentially long period of time before detecting a true data communications link disconnection. Time-out values have typically been set higher than necessary to avoid false disconnection indications. Time-out value selection is further complicated by the fact that most servers must support both long and short duration time-outs concurrently because they support mobile devices with different types of data communications links.

The technical problem exists to find a time-out strategy that minimizes the time needed to detect actual disconnection while properly supporting intermittent disconnections due to temporary communications link interruptions.

SUMMARY OF THE INVENTION

The present invention is directed to providing a mechanism for dynamically varying file system request time-out values based on the actual characteristics of the network connection. The present invention is directed to a client side apparatus and method for measuring the delay found in the data communications link being used and for dynamically modifying the time-out value based on the current delay characteristics.

The present invention is directed to a computer implemented process for detecting network failure with minimal delay in a network system connecting a source device to one or more target devices, the network system operates over any one of a plurality of communication links each having variable communication bandwidth and being subject to intermittent non-failure disconnection. The invention is directed to a process that comprises the following steps: initializing a network service request time-out period for one of the one or more target devices; repeating the following steps for each of a plurality of network service requests to the one of the one or more target devices: issuing a network service request over the communications link; signalling network failure if the network service request is not satisfied within the time-out period; measuring network service request time if the network service request is satisfied; and modifying the time-out period in response to the network service request time.

It is therefore an object of the present invention to measure the actual delay inherent in a data communication link established by a client workstation and to adjust file system request time-out values based on that measurement.

It is another object of the invention to provide an apparatus for differentiating between intermittent and full disconnection of a communication link and to minimize the time required to detect an actual disconnection.

It is still another object of the invention to provide a method for establishing separate time-out values for different types of file system requests in recognition of the processing delays inherent in each type of file system request.

It is yet another object of the present invention to provide a single file system request time-out strategy for multiple types of connections with differing bandwidths and frequencies of disconnection.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
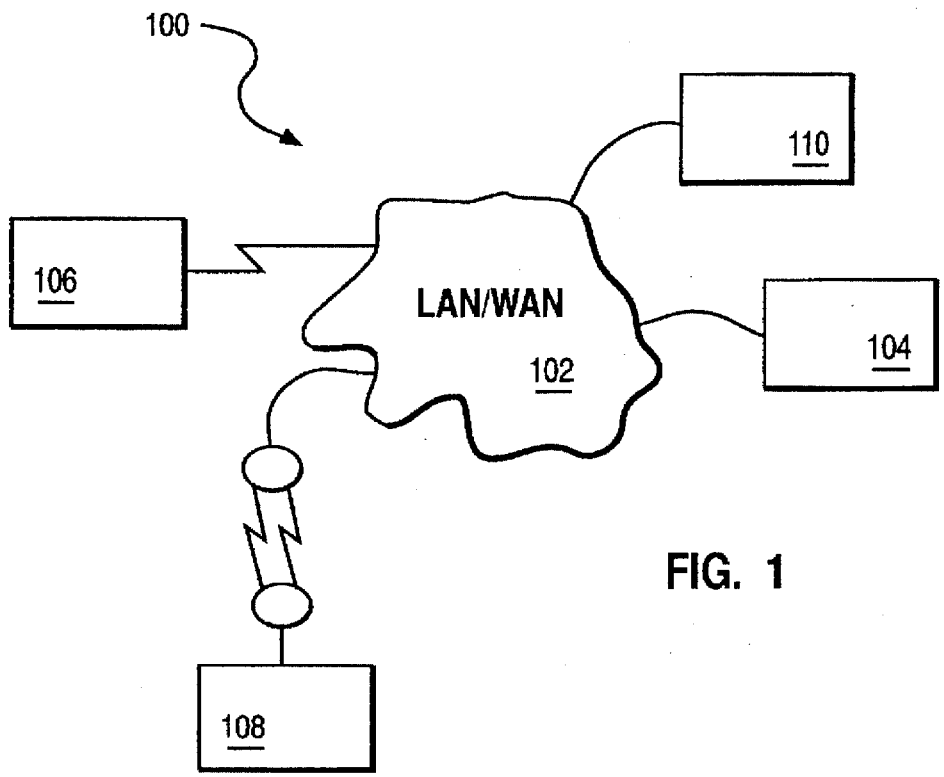
FIG. 1 is a block diagram of a system in which the preferred embodiment of the invention is practiced.

The preferred embodiment of the present invention is used in a network of computer systems. FIG. 1 illustrates a network configuration of computers 100 in which the present invention may be practiced. A local area network (LAN) or wide area network (WAN) interconnects a server 104 with client workstations 106 108 and 110. The clients are each connected through a data communications link. Client workstation 108 is connected using an infrared link. Client 106 is connected through a telephone or cellular telephone link. Client 110 is connected through dedicated network wiring. Each of these clients can expect different network delays and frequency of intermittent disconnections. The preferred embodiment of the present invention operates with any of the above mentioned data communication link types but is not limited to those. Other forms of radio or optical links can be employed. In addition, any form of network protocol may be used including token ring and ethernet protocols.

Figure 2:
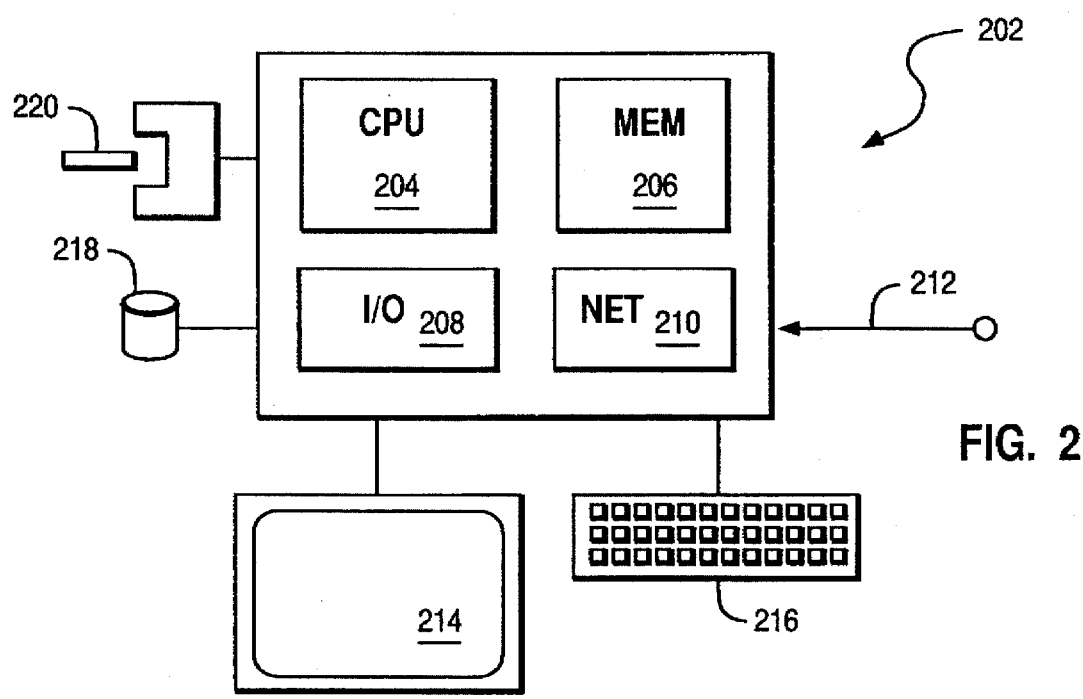
FIG. 2 is a block diagram of a computer system in which the present invention is implemented.

Each of the client and server workstations has a structure similar to that shown in FIG. 2. The workstation 202 includes processor 204, memory 206, I/O controller 208, and communications controller 210. I/O processor 208 supports a number of devices such as a graphic display 214, a keyboard 216, and permanent and removable storage media 218 and 220. The storage media can be of any known type including magnetic and optical disks or cartridges. Communications controller 210 manages communications over a data link connection 212. The present invention can be practiced with many different configurations of computer system. The preferred embodiment is implemented on an IBM ThinkPad Computer System. (IBM and ThinkPad are trademarks of the IBM Corporation.)

Figure 3:
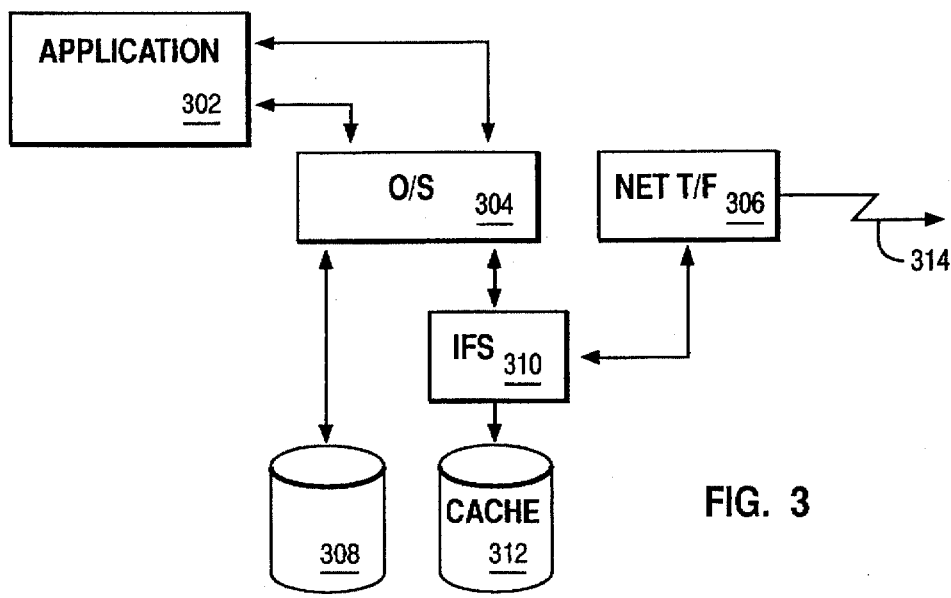
FIG. 3 is a block diagram depicting the relationship between application program, operating system and file system programs.

The present invention allows an application program or system program to access data on a server through a communications link. FIG. 3 illustrates the software structure of a system according to the preferred embodiment of the present invention. An application program 302 requests data for processing by issuing a data request to the operating system 304. The operating system is responsible for managing system resources and satisfying application and system requests for resources. The present invention can be practiced on operating systems such as the IBM OS/2 WARP Operating System, the Microsoft Windows NT operating system, and the UNIX operating system. Operating system 304 satisfies application or system file request by accessing data storage 308. (Storage 308 can be any of the aforementioned data storage media in either permanently installed or removable configurations.) The operating system uses file system access services contained in the operating system or may use Installable File Services 310. Installable file services allows the user of the computer system to install particular file systems to support specific requirements of the user. Examples of installable file systems are the IBM High Performance File System (HPFS) and the IBM Mobile File Synch feature of the IBM Attachpak Program Product. LAN client software such as the IBM LAN Requester are installable file systems that intercept file system requests and pass them over the network to a server for processing.

An installable file system intercepts operating system file services requests and services the request using the particular services of the installable file system. The preferred embodiment of the present invention is implemented in the Mobile File Sync Installable File System. The Mobile File Synch IFS is designed to support mobile computing for users who use networks. When the user is connected via network link 314 to a LAN/WAN configuration, application file system requests are passed by the IFS through the network interface to the LAN/WAN server for servicing. Mobile File Synch includes a mechanism for locally caching data in use by the client system. If the Mobile File Synch detects data link 314 disconnection, then it attempts to satisfy file system requests from local cache 312. While the preferred embodiment uses a file system with caching, the invention is not limited to such a system and can be used with any LAN Client that intercepts operating system file system requests.

The present invention differs from asynchronous file transfer systems in that it processes low level file system requests. Asynchronous file transfers typically request that a specific file be transferred from a server to the client. The file transfer software monitors transmission and ensures that all blocks are sent and received. Some file transfer programs allow retransmission of missed blocks of data. The present invention services low level file system requests such as a request to read one record from a data file. These requests are issued by the application or system program 302 that has no knowledge of whether the data will be found locally or remotely. The present invention transparently services the request from a remote server. The remote server services the request in the same way it would service any other local data request. Direct servicing of requests avoids the delays inherent in cross network transfer of data managed by the network software.

Figure 4:
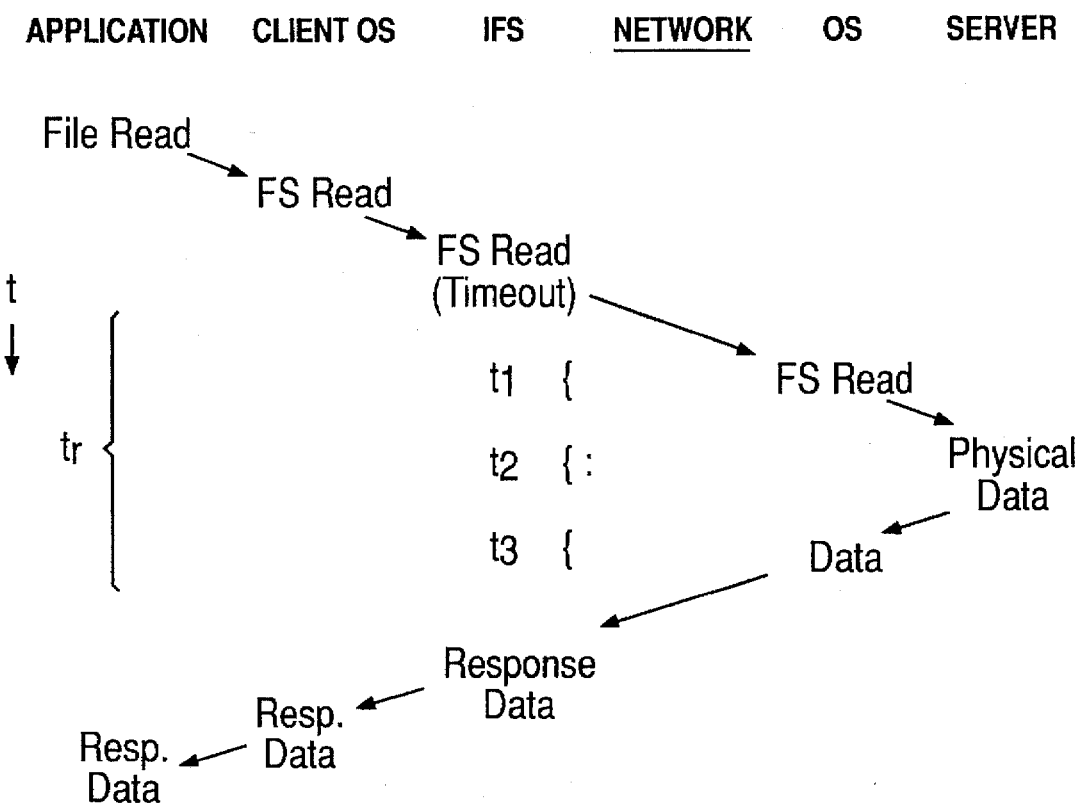
FIG. 4 is a timing diagram that illustrates the timing of a File System request across a network.

The present invention supports all types of low level file system requests. FIG. 4 illustrates the processing of a FileRead request from an application program. This request is issued by the application program to get additional data for processing and may be, for example, a request for the next record from a data file.

The application FileRead request is passed to the operating system which issues a file system read (FSRead) to the file system services. The installable file system intercepts this request and issues a FSRead to the server across the network. The FSRead according to the present invention is issued with a dynamic time-out value that is determined in the manner set forth in greater detail below. The FSRead with time-out is transmitted over the data communications link to the server for processing. The server issues a FSRead to the physical device returning the requested data. The data is returned to the application via the network, installable file system and operating system.

Time delays are present in the FSRead processing as indicated in FIG. 4. In particular, the delay between the IFS FSRead request being issued to the server and receipt of the response is indicated as $t_r$. If the time $t_r$ exceeds the time out value specified by the FSRead with time-out then the installable file system signals a disconnection. As long as the time $t_r$ is less than the time-out value then the IFS takes no action to disconnect even though, in fact, a temporary disconnection occurs. FIG. 4 illustrates the components of $t_r$ including $t_1$ $t_3$, the network transmission delays, and $t_2$ the delay required to service the FSRead request. As each type of request (FSRead, FSWrite, etc.) requires a different service time, the total delay and hence the time-out value preferably varies by type of request.

The present invention dynamically varies the time-out value by measuring the actual time required to service a request. The preferred embodiment sets upper and lower bounds on the time-out to provide a minimum level of intermittent disconnection protection and a maximum wait for actual disconnection. The preferred embodiment allows these parameters to be set by the system user to adapt to particular situations.

Figure 5:
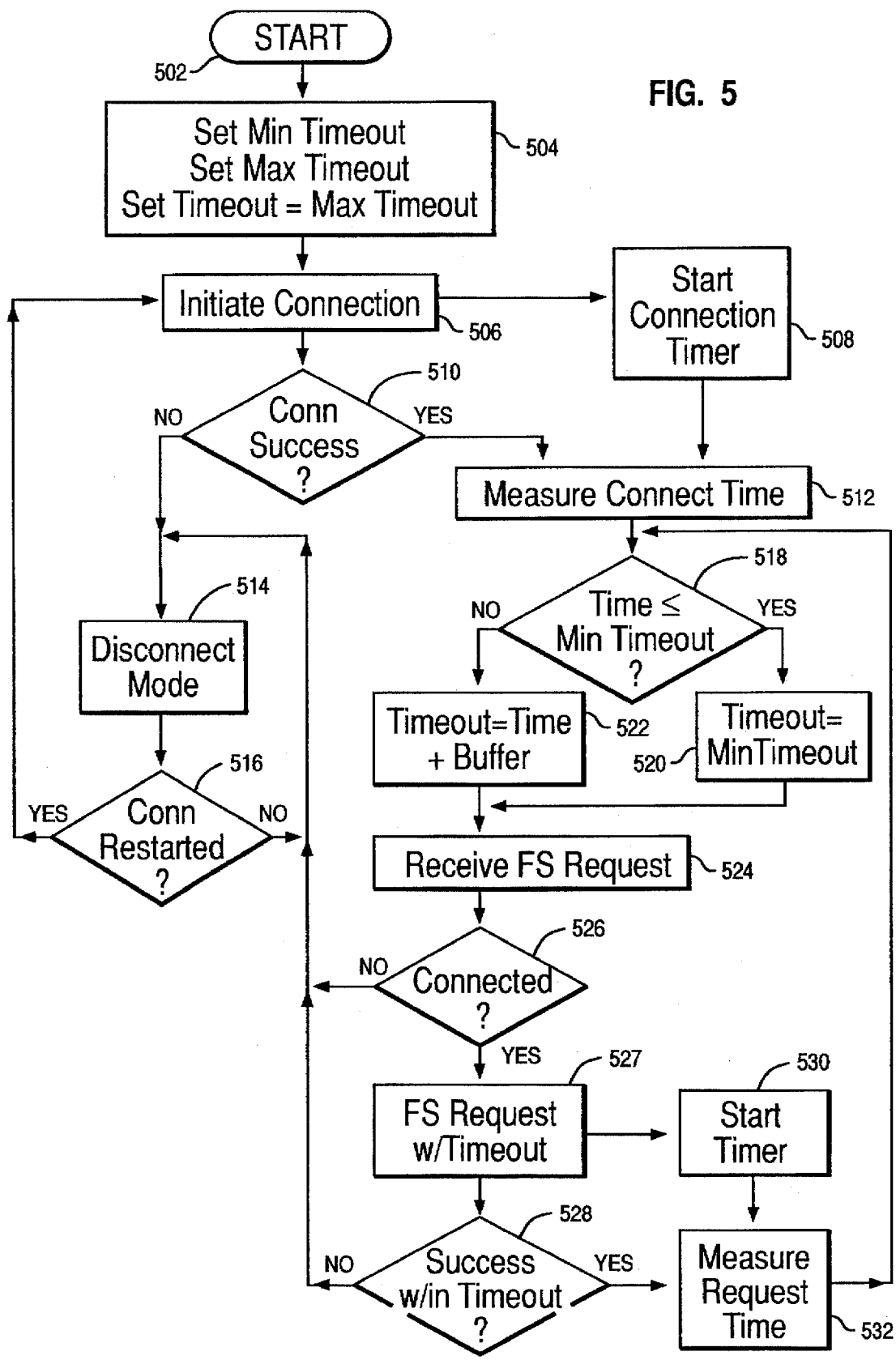
FIG. 5 is a flowchart illustrating the steps of the present invention.
Figure 7:
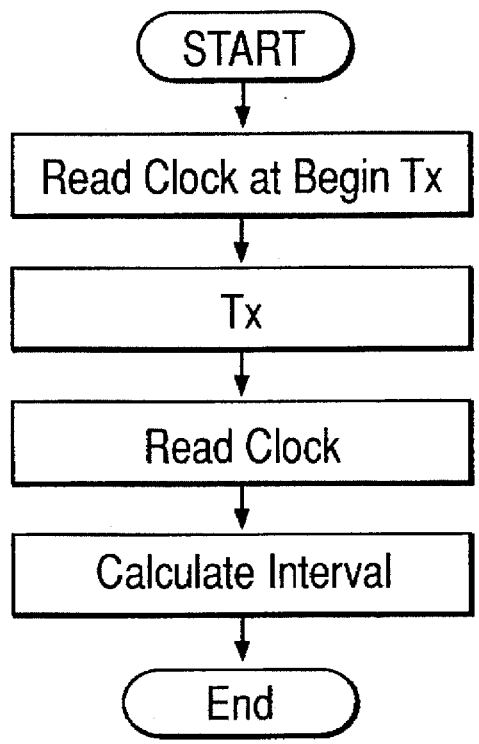
FIG. 7 is a flowchart depicting the steps in the response monitor of the present invention.

The process of the present invention is shown in FIG. 5. The process starts 502 and begins by setting the minimum, maximum and current time-out value. The preferred embodiment uses a minimum time-out value of 15 seconds and a maximum of 60 seconds. Initially, the current time-out value is set to the maximum. The system next attempts the initial connection to the server file system. A connection timer 508 is started when the connection request is sent. If a connection is not completed before the expiration of the time-out period, the system signals failure to connect and the file system operates in disconnected mode 514 until a connection is established. If the connection is successfully completed 510, the length of time required to connect is measured from the connection timer 512. The preferred embodiment uses readings from the system 31.25 millisecond clock to determine elapsed time (see FIG. 7.) Other connect timers could be used, for example, an asynchronous DOS timer.

Next, the connection time is compared 518 to the minimum time-out value. If it is less than or equal to the minimum time-out value the current time-out value is set to the minimum time-out value 520. Otherwise, the current time-out value is set to be the connection time plus a specified buffer time 522. In the preferred embodiment, the buffer time differs for each different type of file system call.

The current time-out value set at the time of connection is used for the next file system request 524 and then adjusted based on the response time for that request. Prior to sending the file system request to the server, the file system of the present invention tests whether a connection exists 526. If no connection exists, disconnection is signalled and the file system enters disconnected mode 514. If a connection exists, the file system request with time-out value is sent 527 to the server. The file system request time is started 530 and then measured upon successful completion 532. The system tests whether the file system request is satisfied within the time-out period 528. If not satisfied, the system enters disconnected mode 514. Otherwise, the actual request service time is calculated. The steps of dynamically adjusting the time-out value 518–522 are repeated for each file system request.

Figure 6:
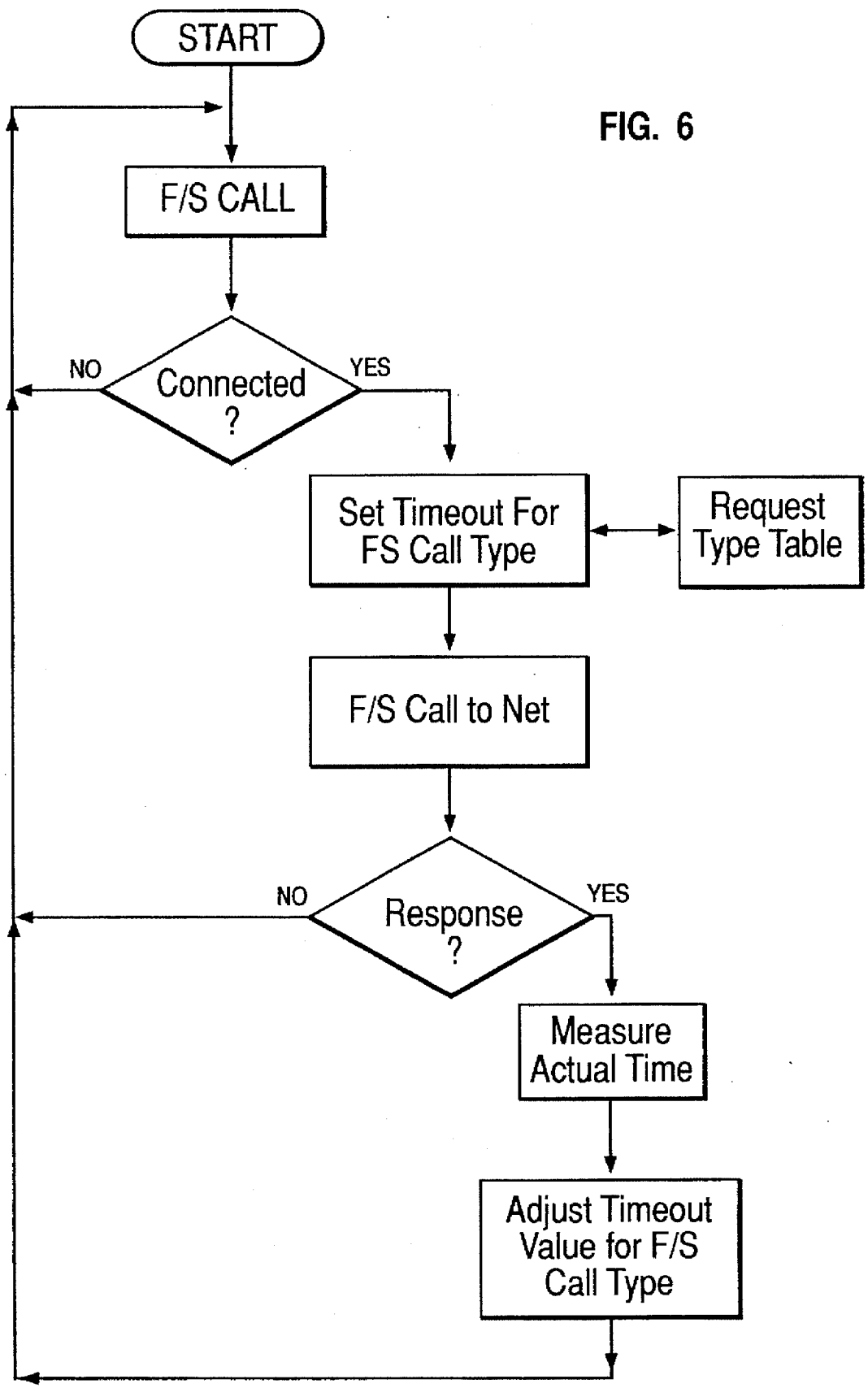
FIG. 6 is a flowchart illustrating in greater detail the steps of the present invention in an alternate embodiment.

In the preferred embodiment, a buffer value is established for each File System request type. Each File System Request type is given an individual time-out value based on actual request servicing time. The buffer value and time-out value for each File System Request type is stored in a table that is accessed whenever a request of that type is issued. Use of the table of buffer and time-out values for file system requests is illustrated in the diagram of FIG. 6. Alternate embodiments are based on a single buffer value and single time-out value. The time-out value of these alternate embodiments must allow for greater variation due to the many service types. The buffer value must be large enough to enable processing of the longest file service request. This results in less than optimal disconnection recognition for shorter period file system requests.

Figure 8:
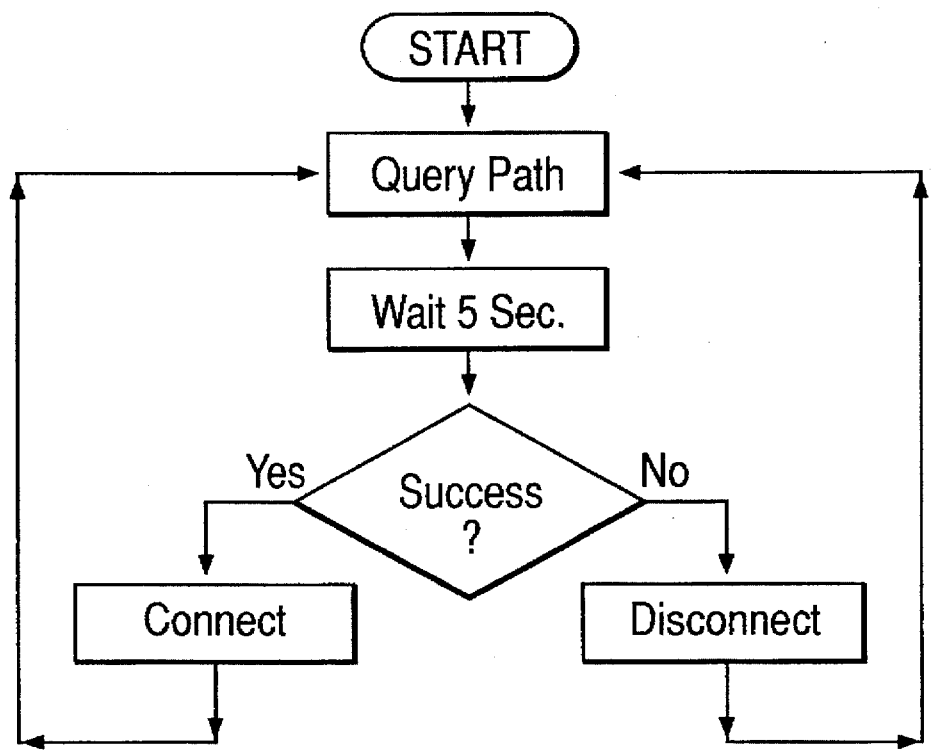
FIG. 8 is a flowchart depicting the steps of the connection testing daemon.

The file system remains in disconnected mode until it receives an indication 516 that the network connection has been restored. The indication can be generated in several ways. In the preferred embodiment of the invention, the file system periodically polls the server to determine if the file system is connected to the server (FIG. 8.) The file system of the preferred embodiment issues a QueryPath request for the directory to which it is intended to be connected. The process blocks until a response is received. The task sleeps for five seconds and then tests for success. If not successful, disconnected mode is signalled. If successful, connected mode is signalled.

Alternatively, the server can send a signal whenever a connection to the client is reestablished.

It will be understood from the foregoing description that various modifications and changes may be made in the preferred embodiment of the present invention without departing from its true spirit. In particular, while file system requests have been used in the description, requests for other shared resources such as serial devices, printers and processor time could be similarly handled. It is intended that this description is for purposes of illustration only and should not be construed in a limiting sense. The scope of this invention should be limited only by the language of the following claims.

We claim:

1. A computer implemented process for detecting network failure while avoiding false detection in a network system connecting a source device to one or more target devices, said network system operable over any one of a plurality of communication links each having variable communication bandwidth and being subject to intermittent non-failure disconnection, the process comprising the steps of:

receiving a minimum and a maximum time-out value for each user of one of said one or more target device;

setting said network service request time-out period equal to said maximum time-out value for said one of said one or more target devices;

repeating the following steps for each of a plurality of network service requests to said one of said one or more target devices:

issuing a network service request over said communications link;

signalling network failure if said network service request is not satisfied by said target device within said time-out period;

measuring network service request time if said network service request is satisfied; and modifying said time-out period for said user in response to said network service request time of each satisfied service request by performing the following steps:

setting said time-out period to the minimum time-out value if said network service request time is less than or equal to said minimum time-out value;

setting said time-out period to the lesser of said network service request time plus a service request buffer interval or said maximum time-out value, if said network service request time is greater than said minimum time-out value.

2. The process of claim 1 wherein the source device contains a system clock, and wherein the step of measuring network service request time comprises the steps of:

reading said system clock and storing a first system clock value in a storage area;

reading said system clock to determine a second system clock value upon successful completion of said network service request before the end of the time-out period; and determining network service request time as the difference between said second system clock value and said first system clock value.

3. The process of claim 1, wherein the step of signalling network failure comprises the steps of:

initializing an independent timer with said time-out period;

starting said independent timer when said network service request is issued;

cancelling said independent timer if said network service request is satisfied before said independent timer completes the time-out period; and cancelling the network service request, cancelling said independent timer, and signalling network failure if said independent timer completes the time-out period before the network service request is satisfied.

4. The process of claim 1 wherein said network services request can be any one of a plurality of network service request types and wherein said service request buffer value and said time-out period is stored and applied independently for each of said network service request types.

5. The process of claim 1 wherein said network service requests are low-level file system requests.

6. The process of claim 1, further comprising the step of:

setting the source device to a disconnected state in response to the signalling of network failure.

7. The process of claim 6 further comprising the steps of:

testing said network for connected state prior to issuing a network service request;

periodically testing for connected state during any period in which said source device is in said disconnected state.

8. The process of claim 7, further comprising the steps of:

setting the source device to a quiescent state in response to a target device failure to acknowledge the network service request after a predetermined number of tries; and sending a signal from said target device to said source device upon reconnection.

9. The process of claim 6 further comprising the step of:

satisfying network service requests from a source device cache when said source device is in said disconnected state.

10. A computer program product for use with distributed computer system connected to a network system, said computer program product comprising:

a computer usable medium having computer readable program code means embodied in said medium for causing detection of network failure with minimal delay while avoiding false failure detection in a network system connecting a source device to one or more target devices, said network system operable over any one of a plurality of communication links each having variable communication bandwidth and being subject to intermittent non-failure disconnection, said computer usable mediums further having:

computer program product means for causing a computer system to receive a minimum and a maximum time-out value for each of said one or more target devices for a user;

computer program product means for causing a computer system to set said network service request time-out period equal to said maximum time-out value of said one of said one or more target devices;

computer program product means for causing a computer system to repeat the following steps for each of a plurality of network service requests to said one of said one or more target devices:

computer program product means for causing a computer system to issue a network service request over said communications link;

computer program product means for causing a computer system to signal network failure if said network service request is not satisfied within said time-out period;

computer program product means for causing a computer system to measure network service request time if said network service request is satisfied; and computer program product means for causing a computer system to modify said time-out period for said user in response to said network service request time for each satisfied request, said means including computer program product means for causing a computer system to set said time-out period to the minimum time-out value if said network service request time is less than or equal to said minimum time-out value;

computer program product means for causing a computer system to set said time-out period to the lesser of said network service request time plus a service request buffer interval or said maximum time-out value, if said network service request time is greater than said minimum time-out value.

11. The computer program product of claim 10 wherein the source device contains a system clock, and wherein the computer program product means for causing a computer system to measure network service request time comprises:

computer program product means for causing a computer system to read said system clock and storing a first system clock value in a storage area;

computer program product means for causing a computer system to read said system clock to determine a second system clock value upon successful completion of said network service request before the end of the time-out period; and computer program product means for causing a computer system to determine network service request time as the difference between said second system clock value and said first system clock value.

12. The computer program product of claim 10, wherein the computer program product means for causing a computer system to signal network failure comprises:

computer program product means for causing a computer system to initialize an independent timer with said time-out period;

computer program product means for causing a computer system to start said independent timer when said network service request is issued;

computer program product means for causing a computer system to cancel said independent timer if said network service request is satisfied before said independent timer completes the time-out period; and computer program product means for causing a computer system to cancel the network service request, cancel said independent timer, and signal network failure if said independent timer completes the time-out period before the network service request is satisfied.

13. The computer program product of claim 10 wherein said network services request can be any one of a plurality of network service request types and wherein said service request buffer value and said time-out period is stored and applied independently for each of said network service request types.

14. The computer program product of claim 10 wherein said network service requests are low-level file system requests.

15. The computer program product of claim 10, further comprising:

computer program product means for causing a computer system to set the source device to a disconnected state in response to the signalling of network failure.

16. The computer program product of claim 15 further comprising:

computer program product means for causing a computer system to test said network for connected state prior to issuing a network service request;

computer program product means for causing a computer system to periodically test for connected state whenever said network during any period in which said source device is in said disconnected state.

17. The computer program product of claim 16, further comprising:

program product means for causing a computer system to set the source device to a quiescent state in response to a target device failure to acknowledge the network service request after a predetermined number of tries; and computer program product means for causing a computer system to send a signal from said target device to said source device upon reconnection.

18. The computer program product of claim 15 further comprising:

computer program product means for causing a computer system to satisfy network service requests from a source device cache when said source device is in said disconnected state.

\* \* \* \* \*